United States Patent Office 2,817,649
Patented Dec. 24, 1957

2,817,649

CATIONIC POLYELECTROLYTES

Leo L. Contois, Jr., Springfield, Mass., assignor to Monsanto Chemical Company, St. Louis, Mo., a corporation of Delaware No Drawing. Application April 26, 1954,
Serial No. 425,735

11 Claims. (Cl. 260—85.5)

This invention relates to novel polyelectrolytes. More particularly, this invention relates to cationic polyelectrolytes and to a process by which they are prepared.

A wide variety of polyelectrolytes can be prepared from polymers of ethylenically unsaturated monomers. Such materials are essentially straight-chain water-soluble polymers containing a plurality of ionizable groups. Because of their ionic characteristics the polyelectrolytes are particularly useful as soil conditioning agents for improving the tilth of the soil. They can also be used as flocculating agents for treating aqueous media having finely divided particles of matter suspended therein in order to form such particles into readily removably aggregates. However, most conventional polyelectrolytes are anionic in nature and, accordingly, of utility only in relatively non-acidic media. If anionic polyelectrolytes are to be used as flocculating agents in conjunction with acidic solutions, as is frequently the case, it is necessary to render such solutions alkaline through the addition thereto of a suitable base such as an alkali metal hydroxide. The treatment of acidic aqueous media with anionic polyelectrolytes and bases in this manner has not been entirely satisfactory in one respect or another and has left much to be desired.

Accordingly, an object of the present invention is the provision of cationic polyelectrolytes.

Another object is the provision of a process for preparing cationic polyelectrolytes.

These and other objects are attained by reacting a nitrile-containing vinylidene polymer with an alkali metal derivative of a di-N-substituted formamide under reaction conditions as set forth herein.

The following examples are given in illustration and are not intended as limitations on the scope of this invention. Where parts are mentioned, they are parts by weight.

*Example I*

Place 1,000 parts of anhydrous N,N-dimethyl formamide in a suitable reaction vessel and add about 75 parts of sodamide thereto. Heat the resultant mixture to reflux temperature with agitation under anhydrous conditions in order to initiate an ammonia-liberating reaction and maintain the agitated reaction mixture at reflux temperature until the evolution of ammonia ceases. This normally requires about 20-24 hours. The product is a suspension of the sodium derivative of N,N-dimethyl formamide in N,N-dimethyl formamide. With continued refluxing and agitation and while maintaining anhydrous conditions, slowly add to the reaction mixture an anhydrous solution of 100 parts of polyacrylonitrile in 1,000 parts of N,N-dimethyl formamide. Continue refluxing and agitation for about 24 hours. At the end of this time the reaction has gone to substantial completion. The reaction product is a suspension of the sodium salt of the addition product of polyacrylonitrile and the sodium derivative of N,N-dimethyl formamide in N,N-dimethyl formamide. Form a suspension of the desired polyelectrolyte by adding 500 parts of ethanol to decompose the sodium salt by replacing the sodium ions thereof with hydrogen ions. Cool the reaction mixture and filter.

In order to purify the polyelectrolyte, wash the filtered residue with N,N-dimethyl formamide and then dissolve the remaining residue in a dilute solution of hydrochloric acid. Filter this solution and treat the filtrate with dilute aqueous ammonia to reprecipitate the polyelectrolyte. Wash the precipitated polyelectrolyte with water and dry. The thus-recovered cationic polyelectrolyte is soluble in aqueous acidic media, decomposes before a melting point is reached and has excellent soil aggregating and flocculating properties.

A substantially identical cationic polyelectrolyte is obtained when an equivalent amount of metallic sodium is substituted for the sodamide and Example I is otherwise repeated in the described manner. In this case, however, hydrogen is evolved during the reaction of the metallic sodium with the N,N-dimethyl formamide.

A molecularly equivalent amount of polymethacrylonitrile can be substituted for the polyacrylonitrile of Example I with equally satisfactory results. In this instance the initial polymeric reaction product is the sodium salt of the addition product of polymethacrylonitrile and the sodium derivative of N,N-dimethyl formamide. The sodium salt can be decomposed by reaction with ethanol to form the desired cationic polyelectrolyte.

*Example II*

Place 1,000 parts of anhydrous N,N-diphenyl formamide in a suitable reaction vessel and add 100 parts of potassium amide thereto. Heat the resultant mixture to reflux temperature with agitation under substantially anhydrous conditions in order to initiate an ammonia-liberating reaction and maintain the agitated reaction mixture at reflux temperature until the evolution of ammonia ceases. This normally requires about 20-24 hours. The product consists essentially of a suspension of the potassium derivative of N,N-diphenyl formamide in N,N-diphenyl formamide, the potassium derivative being only slightly soluble in the unreacted N,N-diphenyl formamide. While the agitated reaction mixture is maintained at reflux temperature, add thereto a separately prepared anhydrous solution of 500 parts of a copolymer of about 20 mol percent of acrylonitrile and 80 mol percent of styrene in 5,000 parts of anhydrous benzene. Continue agitation and refluxing for about 24 hours. At the end of this time the reaction has gone to substantial completion and a reaction product is obtained which is a suspension of the potassium salt of the addition product of the copolymer and the potassium derivative of N,N-diphenyl formamide. Add 500 parts of ethanol to the reaction mixture to decompose the potassium salt and form a suspension of the desired polyelectrolyte by replacing the potassium ions of the salt with hydrogen ions. Cool the reaction mixture and filter.

In order to purify the polyelectrolyte, wash the residue with benzene and then dissolve the washed residue in a dilute solution of hydrochloric acid. Filter this solution and neutralize the filtrate with dilute aqueous ammonia to reprecipitate the polyelectrolyte. Wash the polyelectrolyte with water and dry. The thus-recovered product is soluble in aqueous acidic media, decomposes before a melting point is reached and has excellent soil aggregating and flocculating properties.

The nitrile-containing vinylidene polymers that form the starting materials for the present invention are homopolymers of nitrile-containing ethylenically unsaturated monomers or copolymers of such monomers with other nitrile-containing or nitrile-free ethylenically unsaturated monomers copolymerizable therewith, from 10–100% of the monomer units in such copolymers containing nitrile groups. Representative nitrile-containing monomers that may be used are acrylonitrile, methyacrylonitrile and other alpha-substituted acrylonitriles, vinylidene cyanide, cyano-butadienes, cyano-styrenes, etc. Examples of nitrile-free monomers copolymerizable with one or more of the nitrile-containing monomers are styrene, ring and chain-substituted methyl styrenes such as alpha methyl styrene, ortho methyl styrene, para methyl styrene, etc., conjugated dienes such as butadiene, 1,3-dimethyl butadiene, etc., vinyl esters such as vinyl acetate, vinyl propionate, etc., acrylic acid, methacrylic acid and derivatives thereof such as methyl acrylate, methyl methacrylate, etc. Mixtures of two or more nitrile-containing homopolymers or copolymers may be used if desired.

The nitrile-containing vinylidene polymers of the present invention should be dissolved in an anhydrous organic solvent prior to reaction with the alkali metal derivatives of the di-N-substituted formamides. The solvent should be non-reactive with such alkali metal derivatives. Suitable non-reactive solvents include, for example, di-N-substituted formamides such as N,N-dimethyl formamide, N,N-diethyl formamide, N,N-diphenyl formamide, etc. and other di-N-substituted amide-containing solvents such as N,N-di-methyl acetamide, etc., aromatic hydrocarbons such as benzene, toluene, xylene, etc., aliphatic hydrocarbons such as hexane, heptane, octane, etc. The particular non-reactive solvent to be used will be largely dependent on the chemical composition of the nitrile-containing polymer that is to be used.

The solution characteristics of the nitrile-containing polymers of the present invention tend to vary from polymer to polymer but are well-known to those skilled in the art. Thus, for example, when all or a major amount of the monomer units in the polymer are derived from acrylonitrile or alpha-substituted acrylonitriles, the polymers are, generally speaking, soluble in di-N-substituted formamides such as those listed above. Polymers of other nitrile-containing monomers such as the cyano-styrenes, the cyano-butadienes, etc., on the other hand, are normally soluble in the aliphatic and aromatic hydrocarbon solvents, as are many of the copolymers of nitrile-free ethylenically unsaturated monomers with acrylonitrile and alpha-substituted acrylonitriles. Accordingly, it is seen that a wide variety of solvents are available which may be used in carrying out the reaction. Those solvents which are, generally speaking, reactive with the alkali metal derivatives and which, accordingly, should not be used, include halogenated solvents such as chlorinated aliphatic hydrocarbons, etc., hydroxyl-containing solvents such as aliphatic alcohols, etc. solvents such as formamide and mono-N-substituted formamides which contain reactive hydrogen, etc. The amount of solvent to be used should be sufficient to provide a solution of low viscosity (i. e. a solution which is relatively free-flowing).

The alkali metal derivatives to be used in accordance with the present invention are alkali metal derivatives of di-N-substituted formamides having the general formula

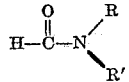

wherein R and R' may be the same or different and are taken from the group consisting of alkyl and aryl radicals. Thus, R and R' may represent phenyl, benzyl, tolyl, naphthyl, cyclohexyl, methyl, ethyl, propyl, isopropyl, butyl, heptyl, octyl, 2-methyl butyl, dimethyl isopropyl, ethyl propyl, etc. radicals. Representative di-N-substituted formamides having the general formula given above include N,N-dimethyl formamide, N,N-diethyl formamide, N,N-dibutyl formamide, N,N-dioctyl formamide, N,N-diethylisobutyl formamide, N,N-diphenyl formamide, N,N-dicyclohexyl formamide, N,N-ditolyl formamide, N-methyl, N-phenyl formamide, N-ethyl, N-tolyl formamide etc. Mixtures of two or more such di-N-substituted formamides may be used if desired.

In order to prepare the alkali metal derivatives of the present invention, a di-N-substituted formamide having the formula given above is reacted with an alkali metal or alkali metal amide, e. g. sodium, potassium, lithium, rubidium, cesium or an amide thereof, such as metallic sodium, metallic potassium, sodamide, potassium amide, etc. At least one mol of the di-N-substituted formamide should be used for each mol of alkali metal or alkali metal amide. The di-N-substituted formamide should be reacted with the alkali metal or amide thereof in solution in an organic solvent medium which is compatible with the organic solvent for the nitrile-containing polymer. Compatible solvents are those which may be added to a solution of the nitrile-containing polymer without causing substantial precipitation of the same. The solvent medium for the di-N-substituted formamide may comprise an excess of the formamide which is to be reacted or may comprise an aliphatic or aromatic hydrocarbon miscible therewith. Mixtures of two or more miscible solvents may be used if desired. At least one volume and, preferably, about 4–6 volumes of the solvent medium should be used for each volume of the di-N-substituted formamide to be reacted with the alkali metal or alkali metal amide. The reaction should be conducted under anhydrous conditions at a temperature of about 50–100° C. It is preferable to conduct the reaction at reflux temperature and to carry the reaction to completion (i. e. until no more hydrogen is evolved in the case of the alkali metals or until no more ammonia is evolved in the case of the alkali metal amides). The alkali metal derivatives of the di-N-substituted formamides which are formed as a result of this reaction have only limited solubility in the solvent medium and, as a result, will be partially dissolved, but mostly suspended therein. If desired, the solvent medium may be evaporated under anhydrous conditions in an inert atmosphere in order to obtain the thus-prepared alkali metal derivatives in solid form. However, it is preferable to use the alkali metal derivatives in the diluted form in which they are inititally obtained. They should be maintained in an anhydrous condition prior to use and, preferably, should be used within a short time after their preparation.

The cationic polymeric addition products of the present invention are prepared by adding an appropriate amount of an alkali metal derivative of a di-N-substituted formamide to the anhydrous organic solvent solution of the nitrile-containing polymer and heating the thus-prepared reaction mixture under anhydrous conditions at a temperature of about 50–100° C. with agitation. The reaction is preferably carried out at reflux temperature in order to reduce reaction time. Although the alkali metal derivatives may be added to the solution of the nitrile-containing polymer in solid form, it is preferable, as previously mentioned, that they be added while dispersed in an anhydrous non-reactive organic solvent medium which is compatible with the solvent for the nitrile-containing polymer.

The molar ratio of nitrile groups in the polymer chain to alkali metal derivative may be varied within comparatively wide limits in order to bring about total or partial formation of cationic-active groups. Thus, the nitrile-containing polymer may be reacted with 0.1–1.0 mol of alkali metal derivative per mol of combined monomer in the polymer. However, the use of a molar excess of alkali metal derivative should preferably be avoided and, accordingly, not more than about 1.0 mol of alkali metal derivative should be used for each mol of combined nitrile. When the polymeric starting material comprises about 10 mol percent of nitrile-containing monomer units it is preferable to effect substantially quantitative conversion of such nitrile groups to cationic active groups by reacting the nitrile-containing polymer with about 0.1 mol of alkali metal derivative per mol of combined monomer in the polymer (i. e. by reacting about one mol of alkali metal derivative with each mol of combined nitrile radical in the polymer). If the polymer comprises a larger percentage of nitrile-containing monomer units, conversion of the nitrile groups to cationic active groups may be partial or complete, provided, however, that the percentage of converted nitrile groups is such that at least 10% of the monomer units in the polymeric addition product contain cationic active groups. For best results it is preferable that the polyelectrolytes of the present invention comprise 20 mol percent or more of monomer units containing cationic active groups. Accordingly, the polymeric starting materials should preferably comprise 20 mol percent or more of nitrile-containing monomer units and such polymeric starting materials should be reacted with in amount of alkali metal derivative sufficient to provide a polymeric addition product containing 20 mol percent or more of monomer units containing cationic active groups (i. e. 0.2 mol or more of alkali metal derivative should be reacted with each mol of combined monomer in the polymer).

When an alkali metal derivative of a di-N-substituted formamide is reacted with a nitrile-containing polymer in accordance with the above-described procedure, an addition product is obtained in the form of the alkali metal salt thereof. The alkali metal ions of the salt may be replaced with hydrogen ions by reacting the salt with a reactive-hydrogen containing compound such as water, an aliphatic or aromatic carboxylic acid, an aliphatic alcohol, etc. As a result of this reaction the alkali metal salt of the addition product is decomposed to form the cationic active polyelectrolytes that comprise the desired end products. The polyelectrolyte can be separated by filtering the reaction mixture, treating the residue with a dilute aqueous acidic media to dissolve the polyelectrolyte, filtering the thus-formed solution and then precipitating the cationic polyelectrolyte from the filtrate by neutralization of the same.

The thus-prepared cationic active polyelectrolytes of the present invention are of particular utility in the treatment of oil well drilling muds, clay-type soils, phosphate slimes, etc. They may also be used as flocculating agents in the refining of sugar and the clarification of water.

What is claimed is:

1. A process for preparing a polymeric addition product which comprises the steps of (1) reacting a compound taken from the group consisting of alkali metals and alkali metal amides with an equimolar amount of a di-N-substituted formamide having the formula

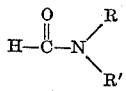

wherein R and R' are taken from the group consisting of alkyl and aryl radicals in solution in an anhydrous organic solvent medium at a temperature of about 50–100° C. with agitation to thereby form a suspension of the alkali metal derivative of the formamide, (2) separately preparing a solution of a vinylidene polymer, at least 10% of the monomer units of which contain nitrile groups, in an anhydrous organic solvent and (3) mixing the dispersion with the solution and heating the mixture at a temperature of 50–100° C. with agitation to form the said polymeric addition product, there being used not more than 1 mol of the alkali metal derivative per mol of combined nitrile and not less than about 0.1 mol per mol of said combined nitrile in the vinylidene polymer; the solvent medium for the alkali metal derivative and the solvent for the vinylidene polymer both being independently selected from the group consisting of di-N-substituted amides having the formula

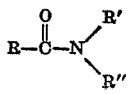

wherein R is taken from the group consisting of hydrogen and a methyl radical and R' and R'' are taken from the group consisting of alkyl and aryl radicals, aromatic hydrocarbons, and aliphatic hydrocarbons.

2. A process which comprises reacting a vinylidene polymer, at least 10% of the monomer units of which contain nitrile groups, with an alkali metal derivative of a di-N-substituted formamide having the formula

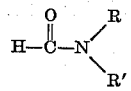

wherein R and R' are taken from the group consisting of alkyl and aryl radicals, said reaction being carried out under anhydrous conditions with agitation at a temperature of about 50–100° C. in the presence of a solvent for the vinylidene polymer, there being used not more than 1 mol of the alkali metal derivative per mol of combined nitrile and not less than about 0.1 mol per mol of said combined nitrile in the vinylidene polymer, the solvent for the vinylidene polymer being selected from the group consisting of di-N-substituted amides having the formula

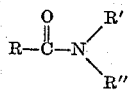

wherein R is taken from the group consisting of hydrogen and a methyl radical and R' and R'' are taken from the group consisting of alkyl and aryl radicals, aromatic hydrocarbons, and aliphatic hydrocarbons.

3. A process which comprises forming a polymeric addition product in the form of an alkali metal salt thereof by reacting a vinylidene polymer, at least 10% of the monomer units of which contain nitrile groups, with an alkali metal derivative or of a di-N-substituted formamide having the formula

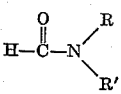

wherein R and R' are taken from the group consisting of alkyl and aryl radicals, and then decomposing the salt by reaction with a compound selected from the group consisting of water, aliphatic carboxylic acids, aromatic carboxylic acids and aliphatic alcohols, the reaction between the alkali metal derivative and the vinylidene polymer being carried out under anhydrous conditions at a temperature of about 50–100° C. in the presence of a solvent for the vinylidene polymer, there being used not more than 1 mol of the alkali metal derivative per mol of combined nitrile and not less than about 0.1 mol per mol of said combined nitrile in the vinylidene polymer, the solvent for the vinylidene polymer being selected from the group consisting of di-N-substituted amides having the formula

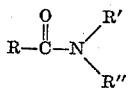

wherein R is taken from the group consisting of hydrogen and a methyl radical and R' and R'' are taken from the group consisting of alkyl and aryl radicals, aromatic hydrocarbons, and aliphatic hydrocarbons.

4. A cationic polyelectrolyte that is prepared by the process which comprises forming a polymeric addition product in the form of an alkali metal salt thereof by reacting a vinylidene polymer, at least 10% of the monomer units of which contain nitrile groups, with an alkali metal derivative of a di-N-substituted formamide having the formula

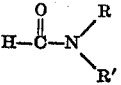

wherein R and R' are taken from the group consisting of alkyl and aryl radicals, and then decomposing the salt by reaction with a compound selected from the group consisting of water, aliphatic carboxylic acids, aromatic carboxylic acids, and aliphatic alcohols, the reaction between the alkali metal derivative and the vinylidene polymer being carried out under anhydrous conditions at a temperature of about 50–100° C. in the presence of a solvent for the vinylidene polymer, said solvent being selected from the group consisting of di-N-substituted amides having the formula

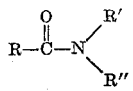

wherein R is taken from the group consisting of hydrogen and a methyl radical and R' and R'' are taken from the group consisting of alkyl and aryl radicals, aromatic hydrocarbons, and aliphatic hydrocarbons, there being used not more than 1 mol of alkali metal derivative per mol of combined nitrile and not less than about 0.1 mol per mol of said combined nitrile in the vinylidene polymer.

5. A process as in claim 3 wherein the vinylidene polymer is polyacrylonitrile and the alkali metal derivative is the sodium derivative of N,N-dimethyl formamide.

6. A process as in claim 3 wherein the vinylidene polymer is polymethacrylonitrile and the alkali metal derivative is the sodium derivative of N,N-dimethyl formamide.

7. A process as in claim 3 wherein the polymer is a copolymer of acrylonitrile with styrene and wherein the alkali metal derivative is the potassium derivative of N,N-diphenyl formamide.

8. A cationic polyelectrolyte prepared by the process of claim 7.

9. A cationic polyelectrolyte as in claim 4 wherein the polymer is polyacrylonitrile.

10. A cationic polyelectrolyte as in claim 4 wherein the polymer is polymethacrylonitrile.

11. A cationic polyelectrolyte as in claim 4 wherein the polymer is a copolymer of acrylonitrile and sytrene.

References Cited in the file of this patent

UNITED STATES PATENTS

| 2,054,740 | Crawford | Sept. 15, 1936 |
| 2,102,179 | Hopff et al. | Dec. 14, 1937 |
| 2,648,648 | Stanton et al. | Aug. 11, 1953 |
| 2,648,709 | Sletzinger et al. | Aug. 11, 1953 |
| 2,677,706 | Grachino | May 4, 1954 |

FOREIGN PATENTS

| 976,959 | France | Mar. 27, 1951 |